Jan. 28, 1958 W. E. BAKER 2,821,605
CONTROL DEVICE
Filed Oct. 11, 1955
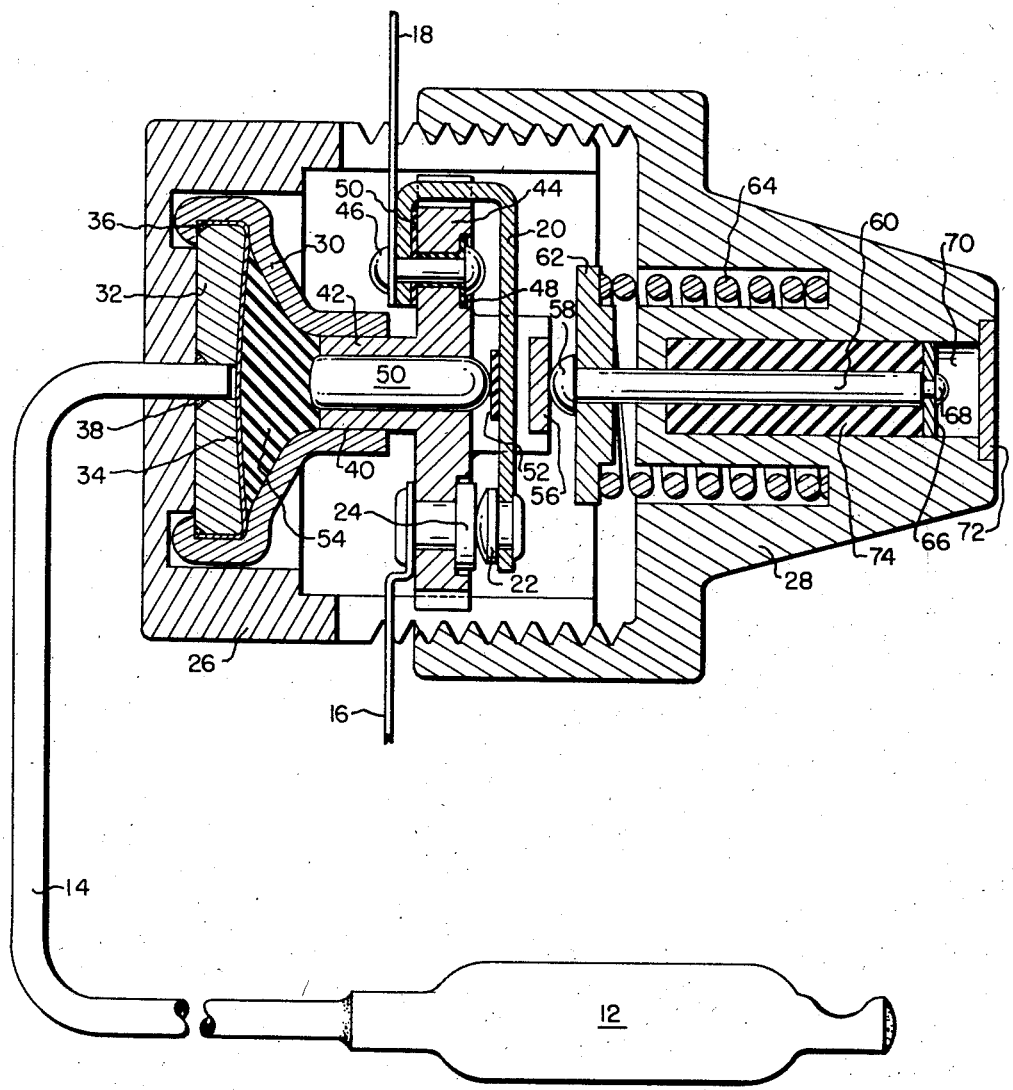
INVENTOR.
WILLIAM E. BAKER
BY
ATTORNEYS

United States Patent Office 2,821,605
Patented Jan. 28, 1958

2,821,605

CONTROL DEVICE

William E. Baker, Wellesley, Mass., assignor to Standard-Thomson Corporation, Waltham, Mass., a corporation of Delaware Application October 11, 1955, Serial No. 539,793

12 Claims. (Cl. 200—140)

The present invention relates to control devices, and more particularly to a device having a pressure-actuated transducer of the type adapted to convert volume displacement of a fluid fill into linear movement of an actuator member of relatively small diameter.

The transduced according to this invention is of the same general class as that disclosed in the copending application of Woods, Serial No. 420,120, filed March 31, 1954, wherein a completely filled thermal liquid system is employed to deflect a metallic diaphragm, thus causing distortion of a deformable, relatively incompressible elastomeric material lying adjacent the diaphragm and constrained to bear upon one end of a slidable metallic actuator pin.

The invention is also related to the disclosure of the copending application of Woods, Serial No. 477,528, filed December 24, 1954, wherein there is disclosed a sleeve which surrounds the pin and is adapted for variable movement toward or away from the body of elastomeric material independently of the pin. This sleeve serves the purposes of providing overtravel protection in the event that the actuator pin reaches an extreme outward position, of providing a means for adjustment of the control point (i. e., the longitudinal position of the actuator pin for a given temperature of the thermal liquid fill), and of providing means to compensate for ambient conditions at the transducer that would otherwise have an undesired influence upon the pin position.

In actuators of the type disclosed in the above applications, it is often desirable to reduce the friction of the elastomeric body against the sides of the actuator pin as far as possible, this friction being the result of the fact that in certain of its positions the pin extends somewhat into the elastomeric body, with the body in contact with the sides as well as the end of the pin. A primary object of the present invention is to provide means to reduce appreciably the magnitude of this friction and its tendency to vary the response characteristics of the actuator as a function of the control point adjustment or compensation.

With the foregoing and other objects in view, an important feature of the invention resides in an arrangement of the parts whereby the results of variations in the applied temperature or pressure are detected or measured in terms of the movement of the actuator pin relative to the overtravel, adjustment and compensation element, as distinguished from motion of the pin relative to a fixed position. As a result of this arrangement, the influence of friction upon the actuator element or pin can be rendered substantially independent of the control point adjustment. Also, the magnitude of the frictional drag upon the pin can be reduced to a minimum, thereby rendering the transducer more responsive to the applied pressure.

According to another feature, the advantages of the novel arrangement are fully utilized in an actuator of the type adapted to operate an electrical switch, wherein the actuator pin has a very short longitudinal stroke between the closed and open positions of the switch.

Another feature resides in the organization and compact structure of the actuator which render it amenable to low-cost manufacture and installation in a limited space.

Other features of the invention resides in certain features of construction, including modes of operation, structures and arrangements of the parts that will be more clearly understood with reference to the following description of a preferred embodiment thereof and the appended drawing illustrating the same.

The drawing illustrates an application of the invention to an electrical switch actuator having a remote thermal control. A thermal bulb 12 is situated in a space subject to the controlling temperature and is connected by a capillary tube 14 to the remote actuator. The actuator is provided with a pair of terminals 16 and 18 which may be interconnected through a leaf contact spring 20, the spring normally tending to close a pair of contacts 22 and 24 connected with the terminals.

The actuator is enclosed within a pair of housing members 26 and 28, the member 28 being threaded onto the member 26. The member 26 is preferably fixed in position, and the member 28 is formed as a knob which may be rotated for control point adjustment in a manner hereinafter more fully described.

The member 26 has an inner annular recess into which is received the rigid metallic body portion of the transducer. This body portion consists of a shell 30 and a slightly dished disk-shaped member 32. A thin, circular, flexible metallic diaphragm 34 having a cylindrical peripheral flange is received over the edges of the disk member 32, and soldered or otherwise hermetically sealed thereto along a continuous line as indicated at 36. The capillary tube 14 is sealed in a similar manner to the disk member 32, as indicated at 38. It is thus seen that the thermal fluid system is hermetically sealed and includes the diaphragm 34 as a flexible wall thereof. The shell 30 is secured to the disk-member 32 over the flange of the diaphragm 34 by any suitable means, for example by spinning the shell over the peripheral margins of the disk as illustrated in the drawing.

The pressure-transmitting system is filled entirely with a suitable fluid, for example a thermal liquid. Thus the volumetric expansion or contraction of the liquid is arranged to produce corresponding flexure of the diaphragm 34, the diaphragm producing variations of volume in the space between itself and the disk member 32 that are substantially equal to the corresponding variations in volume of the liquid fill. But it will be appreciated that the invention is not limited to a thermal system, and in fact can be adapted to any system having provision to vary the pressure of a fill communicating with the space between the diaphragm 34 and the disk member 32, whether such pressure is thermally or mechanically produced.

The shell 30 is provided with a sleeve bearing 40 in which is slidably received a sleeve member 42, the member 42 having a cylindrical portion received within the shell and a circular disk-shaped portion 44. The terminal 16 is riveted by the contact member 24 directly upon the portion 44 of the sleeve member. The terminal 18 is supported on the same member by a rivet 46 insulated therefrom by suitable inserts 48 and 50. The leaf spring 20 is also secured by the rivet 46 and insulated from the disk portion 44 of the sleeve member.

A rigid metal actuator pin 50 is slidably received within the sleeve member 42 and abuts a suitable insulating pad 52 attached to the leaf spring 20. As shown in the drawing, the length of the pin 50 is such that it barely protrudes from the end of the cylindrical portion of the sleeve member 42 when it is in position to allow the leaf spring 20 to close the contacts 22 and 24.

Within the space in the shell 30 between the diaphragm 34 and the pin 50 and sleeve member 42, there is provided a body 54 of deformable material such as natural or synthetic rubber. Preferably, the body 54 is of the form described in the above-mentioned applications, and includes a suitable lubricant as described therein. The nature of this body is such that it is substantially incompressible, and therefore transmits a large proportion of the volumetric displacement caused by movements of the diaphragm 34 to either one or both of the slidable members with which said body is in contact.

The disk-shaped portion 44 of the sleeve member 42 supports a stirrup 56 that extends over the leaf spring 20 at the point where this spring passes through the longitudinal axis of the pin 50. This stirrup bears against the head 58 of a pin 60 slidably received in the member 28. A disk 62 is received over the pin 60 and bears against the head 58 under the action of a compression spring 64 received within an annular recess in the member 28. At the end of the pin 60 opposite to the head 58 there is provided a retaining disk 66 secured to the pin by a screw 68. The disk 66 fits within a cylindrical recess 70 in the member 28 and retains therein a body 74, preferably of the same material as the body 54. The recess may be closed, if desired, by a suitable cap 72. The body 74 serves as a stop for the pin 60 against the action of the spring 64.

In operation, the actuator is in many respects similar to that described in said application Serial No. 477,528, with certain important differences hereinafter more fully described. With the device in the position illustrated in the drawing, the contacts 22 and 24 are closed and the pin 50 protrudes very slightly into the body 54 beyond the end of the cylindrical portion of the sleeve member 42. The diaphragm 34 lies against or close to the wall of the disk member 32. The positions of these parts are the result of an assumed volume of thermal liquid fill, which in turn corresponds to a definite temperature of said fill.

If the temperature of the thermal fill increases from this value, the fill expands in volume and forces the diaphragm 34 away from the wall of the disk member 32, pressing against the deformable body 54 and causing a volumetric displacement therein which is accommodated by motion of the pin 50. Since the diameter of the pin 50 is relatively small, a relatively large longitudinal motion is produced for the given temperature change, and the pin is urged against the leaf spring 20 in the appropirate direction to open the contacts 22, 24.

If the temperature increase is sufficiently great, the spring 20 is urged against the stirrup 56, after which the pin 50 is prevented from sliding further within the sleeve member 42. Any furfther increase in thermal liquid temperature necessarily produces movement of both the sleeve member 42 and the pin 50 as one unit, outwardly against the resisting force of the compression spring 64. Thus the movement of the sleeve member 42 under these conditions provides overtravel protection.

In controls of the type herein described, it is frequently desirable to adjust the contacts to open and close at a given thermal fill temperature. This adjustment is accomplished by rotation of the member 28 while the member 26 is held fixed. By this means the head 58 of the pin 60, which bears upon the stirrup 56, is moved toward or away from the actuator, and produces a like movement of the sleeve member 42. This latter movement produces a corresponding movement of the pin 50 in relation to the sleeve member 42 tending to replace the volume of space within the shell 30 that is displaced by the sleeve 42. Thus for example, a movement of the sleeve member 42 toward the body 54 produces a corresponding movement of the pin 50 away from said body, and vice versa. Therefore, assuming that the thermal liquid temperature is at the value at which the contacts are intended to close, the member 28 is rotated until the pin 50 moves in relation to the sleeve member 42 sufficiently to cause the contacts 22, 24 barely to make contact.

Since the body 74 is of the same material as the body 54, it acts as a means of compensating for changes in the ambient conditions at the actuator. It will be obvious that any influence of ambient conditions at the actuator upon the position of the contacts 22 and 24 is ordinarily undesirable, since these variations ordinarily have nothing to do with the temperature of the thermal fill. Accordingly, means are provided to compensate for expansion or contraction of the volume of the body 54 by reason of variations of the temperature thereof, or other ambient effects as set forth in said application Serial No. 477,528. Thus if the body 54 expands upon an increase in the ambient temperature, which acting alone would tend to thrust the pin 50 outwardly and to open the contacts, the body 74 similarly expands, allowing the sleeve 42 to move with the pin, so that the pin does not move substantially in relation to it. It will be appreciated that only relative motion between the pin and sleeve member produces a change of position of the contacts 22 and 24. In this way the ambient effect is eliminated.

From the foregoing, it will be appreciated that, by reason of a novel arrangement of the parts as hereinbefore described and shown in the drawing, the position of the pin 50 in relation to the sleeve member 42, regardless of adjustment, is necessarily defined as illustrated in the drawing when the contacts 22 and 24 are barely closed. Thus, for any desired control point within the range of adjustment of the device, it is apparent that the pin 50 protrudes but slightly beyond the sleeve member 42 into the body 54 at the control temperature. At a temperature slightly above the control temperature, the pin 50 moves a slight distance in the direction away from the elastomeric body until the contacts 22 and 24 are open. This is the normal range of movement of the pin 50 in relation to the sleeve member 42, and it is unaffected by the temperature for which the device is adjusted. In this respect, the effect of the frictional drag of the body 54 on the pin 50 is reduced to a minimum, and in any event is made independent of both the adjustment and the ambient conditions of the actuator.

As previously indicated, the invention may be adapted in various ways to suit the requirements of control applications other than that illustrated in the drawing. While a preferred embodiment has been described and illustrated, such adaptations in the arrangement of parts, modes of actuation and design as will occur to those skilled in the art after an appreciation of the invention are intended to be included within the spirit and scope thereof.

Having thus described the invention, I claim:

1. A transducer having, in combination, a body portion having a sleeve bearing and a fluid inlet port, a flexible metal diaphragm supported within the body portion in position to define spaces therein respectively communicating with said bearing and port, a capillary tube communicating with said port, said tube, body portion and diaphragm forming a hermetically sealed system, a pressure transmitting fluid entirely filling said system, a sleeve member received in said bearing, a rigid pin received in the sleeve member, a deformable material filling the space within the body portion adjacent the pin and sleeve member, a first resilient means urging the sleeve member toward the body portion, and a second resilient means having a portion fixed in relation to the sleeve member and urging the pin toward the body portion.

2. A transducer having, in combination, a body portion having a sleeve bearing and a fluid inlet port, a flexible metal diaphragm supported within the body portion in position to define spaces therein respectively communicating with said bearing and port, a capillary tube communicating with said port, said tube, body portion and diaphragm forming a hermetically sealed system, a pressure transmitting fluid entirely filling said system, a sleeve member received in said bearing, a rigid pin received in the sleeve member, a deformable material filling the space within the body portion adjacent the pin and sleeve member, a first resilient means urging the sleeve member toward the body portion, adjustable stop means for said first resilient means, and a second resilient means having a portion fixed in relation to the sleeve member and urging the pin toward the body portion.

3. A transducer having, in combination, a body portion having a sleeve bearing and a fluid inlet port, a flexible metal diaphragm supported within the body portion in position to define spaces therein respectively communicating with said bearing and port, a capillary tube communicating with said port, said tube, body portion and diaphragm forming a hermetically sealed system, a pressure transmitting fluid entirely filling said system, a sleeve member received in said bearing, a rigid pin received in the sleeve member, a deformable material filling the space within the body portion adjacent the pin and sleeve member, a first spring urging the sleeve member toward the body portion, adjustable stop means for said first spring, and a second spring secured to a portion of the sleeve member and bearing resiliently on the pin.

4. A transducer having, in combination, a body portion having a sleeve bearing and a fluid inlet port, a flexible metal diaphragm supported within the body portion in position to define spaces therein respectively communicating with said bearing and port, a capillary tube communicating with said port, said tube, body portion and diaphragm forming a hermetically sealed system, a pressure transmitting fluid entirely filling said system, a sleeve member received in said bearing, a rigid pin received in the sleeve member, a deformable material filling the space within the body portion adjacent the pin and sleeve member, a first spring urging the sleeve member toward the body portion, adjustable stop means for said first spring, a second spring secured to a portion of the sleeve member and bearing resiliently on the pin, and a pair of coacting electrical contacts supported in fixed relation to the free portion of said second spring and the sleeve member, respectively.

5. A transducer having, in combination, a body portion having a sleeve bearing, a flexible metal diaphragm supported within the body portion and forming therewith a hermetically sealed space, a pressure transmitting fluid entirely filling said space, a hollow sleeve member received in said bearing, a rigid pin received in the sleeve member, a deformable material filling the space within the body portion adjacent the pin and sleeve member, a first resilient means urging the sleeve member toward the body portion, and a second resilient means supported by the sleeve member and urging the pin toward the body portion.

6. A transducer having, in combination, a body portion having a sleeve bearing, a flexible metal diaphragm supported within the body portion and forming therewith a hermetically sealed space, a pressure transmitting fluid entirely filling said space, a hollow sleeve member received in said bearing, a rigid pin received in the sleeve member, a deformable material filling the space within the body portion adjacent the pin and sleeve member, a spring urging the sleeve member toward the body portion, adjustable stop means for said spring, and resilent means supported by the sleeve member and urging the pin toward the body portion.

7. A transducer having, in combination, a body portion, a flexible metal diaphragm supported within the body portion and forming therewith a hermetically sealed space, a pressure transmitting fluid entirely filling said space, first and second members each slidably received in a wall of the body portion separated from said space by the diaphragm, a deformable material filling the space within the body portion adjacent said members, a first resilient means urging the first member toward the body portion, and a second resilient means supported by said first member and urging the second member toward the body portion.

8. A transducer having, in combination, a body portion having a sleeve bearing, a flexible metal diaphragm supported within the body portion and forming therewith a hermetically sealed space, a pressure transmitting fluid entirely filling said space, a hollow sleeve member received in said bearing, a rigid pin received in the sleeve member and extending beyond said member into the body portion a short distance in comparison with the length of said pin, a deformable material filling the space within the body portion adjacent the pin and sleeve member, a first resilient means urging the sleeve member toward the body portion, and a second resilient means supported by the sleeve member and urging the pin toward the body portion.

9. A transducer having, in combination, a body portion, a flexible metal diaphragm supported within the body portion and forming therewith a hermetically sealed space, a pressure transmitting fluid entirely filling said space, first and second members each slidably received in a wall of the body portion separated from said space by the diaphragm, a deformable material filling the space within the body portion adjacent said members, a first resilient means urging the first member toward the body portion, and a second resilient means supported by said first member and urging the second member toward the body portion, said second member extending into the body portion a short distance in comparison with its length.

10. A transducer having, in combination, a body portion, a flexible metal diaphragm supported within the body portion and forming therewith a hermetically sealed space, a pressure transmitting fluid entirely filling said space, first and second members each slidably received in a wall of the body portion separated from said space by the diaphragm, a deformable material filling the space within the body portion adjacent said members, a spring urging the first member toward the body portion, adjustable stop means for said spring, and resilent means supported by said first member and urging the second member toward the body portion.

11. A transducer having, in combination, a pair of frame members having an adjustably threaded connection, a body portion secured to one of said frame members, a flexible metal diaphragm supported within the body portion and forming therewith a hermetically sealed space, a pressure transmitting fluid entirely filling said space, first and second slidable members each received in a wall of the body portion separated from said spaced by the diaphragm, a deformable material filling the space within the body portion adjacent said slidable members, a spring bearing at one end upon the other frame member and at the other end upon the first slidable member, and resilient means supported by said first slidable member and urging the second slidable member toward the body portion.

12. A transducer having, in combination, a pair of frame members having an adjustably threaded connection, a body portion secured to one of said frame members, a flexible metal diaphragm supported within the body portion and forming therewith a hermetically sealed space, a pressure transmitting fluid entirely filling said space, first and second slidable members each received in a wall of the body portion separated from said space by the diaphragm, a first deformable material filling the space within the body portion adjacent said slidable members, spring means bearing at one end upon the other frame member and urging the first slidable member toward said body portion, resilient means supported by one of said slidable members and urging the first slidable member toward said body portion relative to the second slidable member, and a second deformable body supported in position to act as a stop for said spring means, whereby ambient changes in said first body are compensated for by corresponding responsive movements of said stop to tend to prevent relative movement between said slidable members.

References Cited in the file of this patent
UNITED STATES PATENTS

| | | |
|---|---|---|
| 2,671,136 | Greenawalt | Mar. 2, 1954 |
| 2,742,232 | Dillman | Apr. 17, 1956 |